(12) United States Patent
Anatole et al.

(10) Patent No.: US 10,338,405 B2
(45) Date of Patent: Jul. 2, 2019

(54) EYEGLASSES EQUIPMENT INCLUDING A JOINT AND METHOD FOR MANUFACTURING SUCH AN EYEGLASSES EQUIPMENT

(71) Applicant: ESSILOR INTERNATIONAL (COMPAGNIE GENERALE D'OPTIQUE), Charenton-le-pont (FR)

(72) Inventors: Vincent Anatole, Charenton le Pont (FR); Guillaume Martin, Charenton le Pont (FR); Philip Miller, Dallas, TX (US); Gabriel Keita, Dallas, TX (US); Gerard Gelly, Charenton le Pont (FR); Vincent Guilly, Charenton le Pont (FR); Bjorn Drobe, Kerrisdale (SG)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 19 days.

(21) Appl. No.: 15/540,671

(22) PCT Filed: Dec. 30, 2015

(86) PCT No.: PCT/IB2015/002595
§ 371 (c)(1),
(2) Date: Jun. 29, 2017

(87) PCT Pub. No.: WO2016/108084
PCT Pub. Date: Jul. 7, 2016

(65) Prior Publication Data
US 2017/0343833 A1  Nov. 30, 2017

(30) Foreign Application Priority Data

Dec. 31, 2014 (WO) .................. PCT/IB2014/003142

(51) Int. Cl.
*G02C 1/06* (2006.01)
*G02C 7/02* (2006.01)
(Continued)

(52) U.S. Cl.
CPC .......... *G02C 1/06* (2013.01); *B29D 11/00432* (2013.01); *B33Y 80/00* (2014.12); *G02C 7/02* (2013.01)

(58) Field of Classification Search
CPC .................................... G02C 1/06; G02C 7/02
(Continued)

(56) References Cited

U.S. PATENT DOCUMENTS

| 5,444,502 A | 8/1995 | Hyoi |
| 7,160,621 B2 | 1/2007 | Chaudhari et al. |

(Continued)

FOREIGN PATENT DOCUMENTS

| FR | 2 987 918 A1 | 9/2013 |
| GB | 741 514 A | 12/1955 |

(Continued)

OTHER PUBLICATIONS

International Search Report, dated Apr. 26, 2016, from corresponding PCT application.

*Primary Examiner* — Collin X Beatty
*Assistant Examiner* — Grant A Gagnon
(74) *Attorney, Agent, or Firm* — Young & Thompson

(57) ABSTRACT

Disclosed is eyeglasses equipment (1) including a frame (10), and at least one ophthalmic lens (20) mounted into the frame. The equipment includes a colored interface (30) that is placed between the frame and the lens.

23 Claims, 3 Drawing Sheets

(51) Int. Cl.
 *B29D 11/00* (2006.01)
 *B33Y 80/00* (2015.01)
(58) Field of Classification Search
 USPC .......................................................... 351/86
 See application file for complete search history.

(56) References Cited

U.S. PATENT DOCUMENTS

| | | |
|---|---|---|
| 8,205,345 B2 | 6/2012 | Tesseraud |
| 2005/0073654 A1 | 4/2005 | Sheldon |
| 2007/0252944 A1 | 11/2007 | Welchel et al. |
| 2015/0109577 A1 | 4/2015 | Haddadi et al. |

FOREIGN PATENT DOCUMENTS

| | | |
|---|---|---|
| WO | 2013/132049 A1 | 9/2013 |
| WO | 2013/132165 A1 | 9/2013 |
| WO | 2013/149891 A1 | 10/2013 |
| WO | 2014/195471 A1 | 12/2014 |

EYEGLASSES EQUIPMENT INCLUDING A JOINT AND METHOD FOR MANUFACTURING SUCH AN EYEGLASSES EQUIPMENT

TECHNICAL FIELD TO WHICH THE INVENTION RELATES

The present invention relates in general to eyeglasses.

The invention applies more particularly to an eyeglasses equipment including a frame and ophthalmic lenses mounted into the frame.

The invention also relates to a method for providing an eyeglasses equipment to a wearer, including steps of selecting a frame, selecting ophthalmic lenses, and mounting said lenses into said frame.

TECHNOLOGICAL BACKGROUND

The technical part of the profession of an optician consists in mounting a pair of correcting ophthalmic lenses in an eyeglass frame selected by a wearer.

This mounting comprises at least five main operations:
  acquiring the shape of a longitudinal profile representative of the shape of the outline of one of the surrounds of the selected eyeglass frame;
  order a lens in accordance with filter needs an/or compensation of vision defect of the wearer;
  centering the ophthalmic lens under consideration, i.e. positioning and orienting said longitudinal profile appropriately on the lens, in such a manner that once machined to have this profile and then mounted in its frame, the lens is positioned correctly relative to the corresponding eye of the wearer, so as to enable it to perform as well as possible the optical function for which it is designed;
  shaping the lens, i.e. machining its outline to have the shape of the longitudinal profile; and then
  assembling the lens together with the frame.

With rimmed eyeglass frames, the surround (or "rim") is designed to surround the entire periphery of the lens. Shaping then involves a beveling operation which consists in forming an engagement ridge all along the edge face of the lens for the purpose of engaging in a groove, commonly known as a bezel, that runs around the inside face of the rim of the eyeglass frame.

With half-rimmed eyeglass frames, the surround comprises a half-rim that matches the top portion of the outline of the lens, and a string that runs along the bottom portion of the outline of the lens in order to hold the lens against the half-rim. Shaping then involves a grooving operation that consists in forming an engagement groove along the edge face of the lens, with the top portion of the groove serving to receive a ridge provided along the bottom face of the half-rim and with the bottom portion of the groove serving to receive the string.

Neither of those two methods is really flexible.

Indeed, the shape of the selected frame rigidly dictates the range of lenses which can be selected. For instance, if the frame presents a high curvature, the optician is compelled to choose a lens blank that also presents a high curvature. Because all combinations of lens are not accessible with the right curvature and diameter of the surrounds of the selected frame, some people can not select all the optician's frames, because of their vision deficiencies.

Another problem of the known solutions is that the assembly of the lenses into the frame put constraints on the lenses. That is why it is necessary to select the proper lens geometry and the right material as a function of the characteristics of the frame. For example, all lens edge thicknesses are not compatible with half-rimmed frames.

Moreover, once the eyeglasses are assembled, it is not easy for wearers to modify the aesthetical aspect of their piece of eyewear.

In addition to these various drawbacks, such an assembly has a major disadvantage that we would like to solve.

This disadvantage mainly affects lenses for myopic people, whose thicknesses at the edges are great.

Indeed, it may be observed that the light rays which enter the interior of the ophthalmic lenses and that are reflected on the edges of the lenses generate light halos, for instance in the form of milfoil, called "myopic ring". These rings, created by total internal reflections in the lenses, exit by the front faces of lenses and are quite visible.

Thus these halos are not only unsightly (for people who look at the wearer), but also unpleasant for the wearer (especially when he sees himself on photos taken with a raking light).

OBJECT OF THE INVENTION

The object of the present invention consists in modifying the structure of the eyeglasses equipment in order to reduce these halos.

More precisely, the invention consists in an eyeglasses equipment including a frame, at least one ophthalmic lens, and an interface that is situated between said frame and said lens and that is colored in such a manner that it reduces halos.

In a preferred embodiment, this interface is a joint manufactured by an additive technology, that is placed between said frame and said lens and that fastens said frame to said lens.

The invention also consists in a method for providing an eyeglasses equipment including steps of:
  selecting a frame,
  selecting at least one ophthalmic lens to be mounted into said frame,
  determining a color for an interface, and
  assembling said lens and said frame so that said interface is situated between said frame and said lens.

In a preferred embodiment where said interface is a joint, this method includes steps of:
  selecting a frame,
  selecting at least one ophthalmic lens,
  acquiring at least one geometrical characteristic of the frame,
  acquiring at least one geometrical characteristic of the lens,
  manufacturing a joint by additive technology, so that this joint presents a shape determined as a function of said geometrical characteristics, and
  assembling said lens, said joint and said frame, by placing said joint between said frame and said lens.

In an another embodiment of the invention, it also consists in a method for providing an eyeglasses equipment including steps of:
  selecting a frame, and
  selecting at least one ophthalmic lens to be mounted into said frame,
  selecting a joint from a multiple selection of joints presenting a shape determined as a function of at least one geometrical characteristic of the frame and/or at least one geometrical characteristic of the lens, assembling said lens, said selected joint and said frame, by placing said joint between said frame and said lens.

Thus, the interface absorbs visible light and reduces halos.

Using a join has a plurality of advantages.

First, the joint has a mechanical effect: it reduces the stresses exerted on lenses by frames (that is particularly interesting for lenses coated with inorganic layers). This would eliminate the problems with distortion and crazing caused by clamping a lens into a frame too tightly.

The joint also provides a new degree of freedom to the optician that is able to manufacture any kind of lenses for any kind of frames.

Another interest of the joint is to be able to manufacture optical equipment in accordance with safety regulation (more particularly to United States). Indeed, the joint may present an anti-popping function, which guarantees a good bearing of lenses to the frame. This is especially attractive for kids.

Finally, using an additive technology to manufacture the joint has other advantages.

For instance, because of some chosen manufacturing method, frames of a same model differ significantly. For example, the rims of a frame may be twisted when the rims of another frame of the same model are not twisted. Using an additive technology to manufacture the joint has the advantage to compensate these differences, by correctly adjusting the shape of the joint (width, thickness) as a function of the shape of the frame or/and of the lens.

Another example of advantage is the case where a customer has ordered a frame and two lenses over the Internet. In this case, he may receive also one or several joint(s) that are able to suit to the frame and to the lenses, so that the customer may easily install the joint between the frame and the lenses.

Another advantage of the joint is that, if there is a misfit between the joint and the frame or between the joint and the lens, the joint may be easily machined or remanufactured, without any consequence because this joint is less expensive than the lenses and the frame.

Others advantages will clearly appear in the description.

Other characteristics of said eyeglasses equipment are:

the diopter between said lens and said interface has a level of light absorption that is greater than the level of light absorption of the diopter between said lens and the internal face of said frame;

said interface extends at least along a nasal part or a temple part of the periphery of the ophthalmic lens;

said interface covers the entire width of the ophthalmic lens;

said interface is a thin layer of material distinct from the material of the ophthalmic lens and from the material of the frame;

said joint is manufactured by additive technology;

said joint is colored in the mass;

said joint is made from a material that is different from the material of the lens and that is also different from the material of the frame;

said joint, said frame and said lens form separate pieces;

said joint and at least a part of said frame form a single piece;

said joint and said lens form a single piece;

said joint is formed from an elastic material;

said joint comprises a temporal part that has a function of hinge for a temple of said frame;

said joint is formed from a rigid material;

said joint comprises a temporal part that has a function of attachment for a temple of said frame;

said joint is formed from an auxetic material;

said joint houses at least one electric and/or electronic component.

Other characteristics of said method are:

said joint, said lens and said frame are manufactured from separate pieces;

said joint and said lens are manufactured to form a single piece;

said joint and at least a part of said frame are manufactured to form a single piece;

said frame is manufactured together with other identical standardized frames;

at least one electrical component is manufactured by additive technology together with said joint, so that said electrical component is housed into said joint.

DETAILED DESCRIPTION OF AN EMBODIMENT

The following description with reference to the accompanying drawings, given by way of non-limiting example makes it clear what the invention consists in and how it can be reduced to practice.

In the following description, the terms "elastic" and "rigid" will be used relative to each other to characterize materials, an elastic material having a young modulus smaller than the one of a rigid material.

For instance, we may consider that the young modulus of an elastic material is less than 0.1 GPa, and that the young modulus of a rigid material is strictly greater than 0.1 GPa.

The present invention relates in general to eyeglasses.

Figure 1:
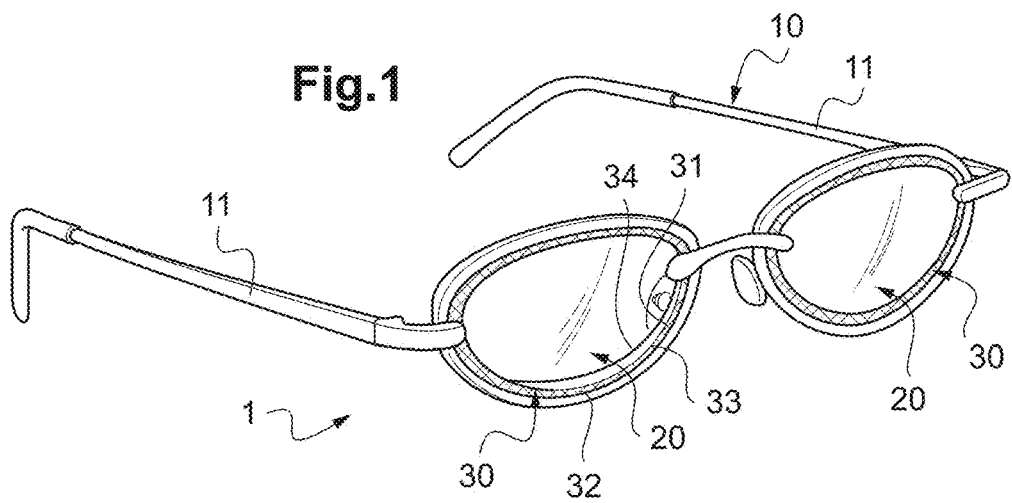
FIGS. 1 to 3 are schematic views in perspective of three embodiments of an eyeglasses equipment according to the invention.
Figure 2:
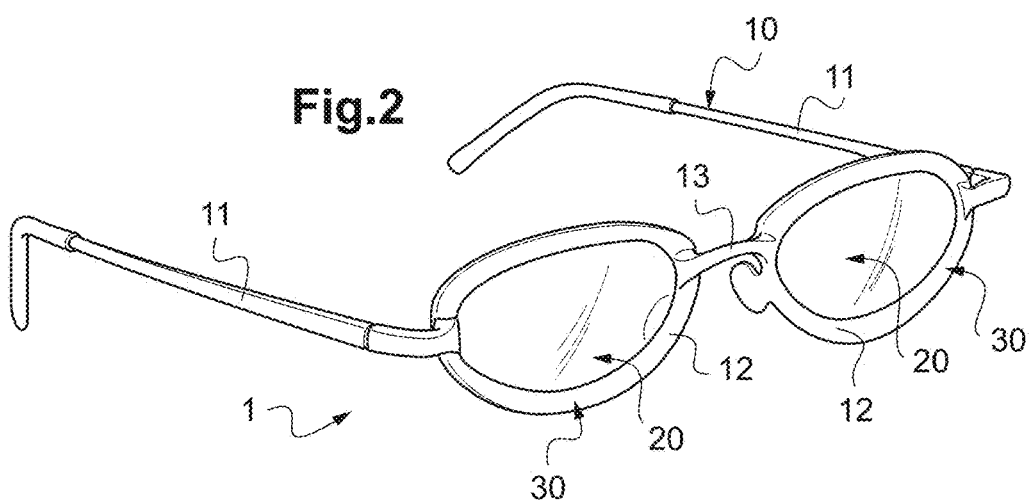
Figure 3:
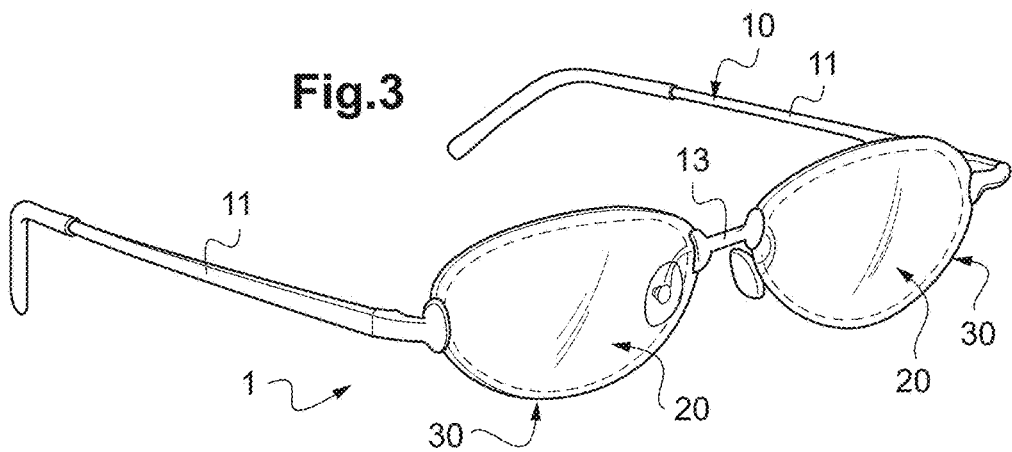

As shown in FIGS. 1 to 3, the invention applies more particularly to an eyeglasses equipment 1 including a frame 10 and two ophthalmic lenses 20 mounted into the frame 10.

The invention applies particularly to full-rim frames and half-rim frames (also called "Nylor frames") made from plastic or metal. It may also apply to no-rim frames.

Each lens 20 may be a lens without any correction effect (for instance a lens for sunglasses) or a corrective lens (for instance, Fresnel lens type or Readers or unifocal or bifocal or trifocal or progressive lens).

When the lens 20 is a corrective lens made for a myopic wearer, it may have a great edge thickness. Its thickness may be greater than the one of the frame, at least along the temple part of the frame. In this situation, the edge of the lens protrudes on the back side of the frame.

The solution proposed by the invention is to introduce an intermediate component between the frame 10 and each lens 20.

This intermediate component, called "interface", is tinted. It may be tinted in order to be matt or may be colored.

Advantageously, the interface has a level of light reflection that is lower than that of the internal face of each rim of the frame 10. Thus, it reduces the rates of light rays that reflect onto the peripheral face of the ophthalmic lens 20.

Because this phenomena of light reflection creates halos that are all the more important as the lens edge thickness is great (lenses for myopic wearers), and because this edge thickness is usually the greatest along a temple part of the ophthalmic lens 20, the interface 30 extends at least along the temple part of the edge of the ophthalmic lens 20.

In a preferred embodiment, this interface 30 surrounds the entire periphery of the ophthalmic lens 20.

In this preferred embodiment, the interface 30 also covers the entire width of the ophthalmic lens 20, even if the lens protrudes on the back side of the frame.

Indeed, when the lens protrudes on the back side of the frame, the light could enter in the lens by the edge of the lens, which could sensibly increase the phenomena of halos.

Thanks to the interface 30 which covers the entire side face of the ophthalmic lens 20, the entrance of light by the edge of the lens is prevented, which reduces significantly the halos.

Thus, the interface 30 reduces discomfort for the wearer and improve the appearance of the assembly.

The color of the interface is preferably darker or matter than that of the spectacle frame 10. In a preferred embodiment, the interface is black.

Other variants are possible.

In a first variant, the color of the interface 30 may be chosen by the wearer.

In a second variant, the color of the interface 30 may depend on colorimetric data acquired by an optician. For instance, the optician may acquires the color of the skin of the wearer or the color of an object of the wearer (tie, handbag, the frame . . . ) and may manufacture the interface so that at least a part of the interface is of this color.

In a third variant, the internal face of the interface (which faces towards the lens) may be in a color different from the one of the external face of the interface. The color of the external face of the interface 30 may be chosen for esthetic reasons (for instance in the same color as the frame). The color of the internal face of the interface 30 is chosen to reduce the halos. In this variant, the interface 30 may be constituted by an inexpensive tape (for example an adhesive tape) with two faces of different colors.

This interface may be constituted by a thin layer of material distinct from the material of the ophthalmic lens 20 and from the material of the frame 10. For instance, it may be constituted by a thin film deposited on the edge of the lens or on the internal face of each rim of the frame 10, or by a paint coating, or by an adhesive tape.

In the represented embodiment, the intermediate component is manufactured by additive technology, and is called "joint 30".

Colored on its surface or in the mass, the joint 30 reduces halos.

Situated between the frame 10 and one of the two lenses 20, each joint 30 fastens the lens 20 to the frame 10.

"Additive technology" is a manufacturing technology as defined in the International standard ASTM 2792-12, which mentions a process of joining materials to make objects from 3D model data, usually layer upon layer, as opposed to subtractive manufacturing methodologies, such as traditional machining.

The additive technology also called additive manufacturing method may be selected in, but is not limited to, the list consisting of stereolithography, mask stereolithography or mask projection stereolithography, polymer jetting, selective laser sintering or SLS, selective laser melting or SLM, fused deposition modeling or FDM. Additive manufacturing technologies comprise processes which create objects by juxtaposition of volume elements according to a pre-determined arrangement that can be defined in a CAD (Computer Aided Design) file.

Such juxtaposition is understood as the result of sequential operations such as building a material layer on top of a previously obtained material layer and/or juxtaposing a material volume element next to a previously obtained volume element. The primary advantage of this technique is its ability to create quickly and at a relatively low cost almost any shape or geometric feature.

Each joint 30 is here manufactured thanks to additive technology (here, thanks to a 3D printer). The cost of each joint 30 is thus reduced.

According to a preferred embodiment of the invention, each joint 30 is shaped so that it surrounds the entire periphery of the associated lens 20.

As it will be explained in more details hereinafter, this joint 30, the frame 10 and each lens 20 can form separate pieces (see FIG. 1).

In another embodiment, the joint 30 and the frame 10 may form a single piece (see FIG. 2).

In a third embodiment, the joint 30 and the associated lens 20 may form a single piece (see FIG. 3).

In these embodiments, the joint 30 is advantageously made from a material that is different from the material of the lens 20 and that is also different from the material of the frame 10. In practice, the joint 30 is manufactured by a process that is different from the process used to manufacture said lens 20 and that is also different from the process used to manufacture said frame 10.

In the embodiment of FIG. 1, where the joint 30 acts as a mechanical interface between the lens 20 and the frame 10, this joint 30 is preferably manufactured from an elastic material.

An example of such an elastic material is silicone.

In this embodiment, the frame 10 and the lenses 20 are standard and will not be described. The joint 30 is shaped so it blocks the lens 20 into the associated rim of the frame 10.

In the embodiment of FIG. 2, where the joint 30 acts as a part of the frame, this joint 30 is also preferably manufactured from an elastic material.

In the embodiment of FIG. 3, where the joint 30 acts as a part of the lens, this joint 30 is preferably manufactured from a rigid material.

An example of such a rigid material is polycarbonate.

In a variant, the joint 30 may act as a buffer device and may have not homogeneous properties around the lens 20. On the contrary, the joint 30 may have locally optimized properties to take into account the concentrations of stress.

For instance, the chosen material may be more elastic in local areas where:
 the frame 10 is able to exert stresses on the lens 20 (for example near the bridge of the frame), and/or
 the wearer is able to exert stresses on the eyeglasses equipment 1 due to his morphology, his usage or his attitude (for example near the temples of the frame).

In another variant of the invention, the joint 30 may be constituted from an auxetic material.

Figure 5:
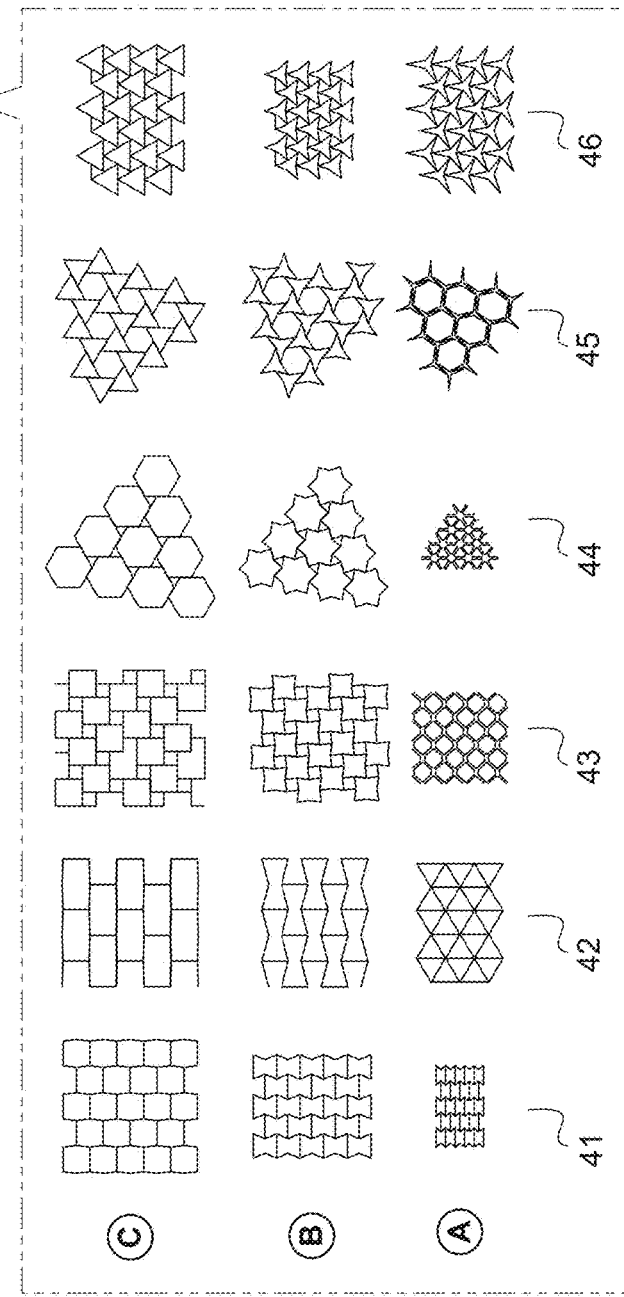
FIG. 5 shows different auxetic structures represented in three different states.

Such an auxetic material is an open structure based on a negative Poisson coefficient. Illustrations of such open structures are represented on FIG. 5.

On this figure, we have shown six kinds of structures 41, 42, 43, 44, 45, 46 that are represented:
 in a non-solicited state on line A,
 in a intermediate-solicited state on line B, and
 in a solicited state on line C.

As shown on this figure, when a vertical stress is exerted on the structure, not only its length but also its width increase. In other words, when stretched, this material becomes thicker perpendicular to the applied force.

For more information about auxetic materials, document U.S. Pat. No. 7,160,621 can be consulted.

Thanks to this material, the joint 30 reinforces the optical equipment 1 in case of mechanical solicitations for example such as distortion, crazing or internal stress caused by clamping the lens in the frame.

The technical part of the profession of an optician consists in mounting the pair of lenses 20 in the frame 10 selected by the wearer, thanks to the joint 30.

In more details, the method to provide the eyeglasses equipment 1 to the wearer comprises the steps consisting in:
- let the wearer selecting a frame 10, in accordance with his aesthetic and functionality criteria,
- selecting the lenses 20 to be mounted into said frame 10, in accordance with filter needs and/or compensation of vision defects of the wearer,
- acquiring at least one geometrical characteristic of the frame 10 and/or at least one geometrical characteristic of the lenses 20,
- manufacturing each joint 30 by additive technology, the shape of the joints 30 being selected as a function of said geometrical characteristics in order to provide two joints 30 that permit to guarantee a perfect fit and easy mounting of said lenses 20 into said frame 10 without any mechanical and/or physical modification of the properties of the lenses 20 and/or of the frame 10, and the colors of the joints 30 being selected depending on the color of the frame,
- assembling said lenses 20, said joints 30 and said frame 10, by placing said joints 30 between said frame 10 and said lenses 20.

To operate these steps, the optician has, in his laboratory, a grinding machine, a 3D printer and a control unit.

Thanks to the control unit, the optician is able to order an uncut finished lenses (called "semi-finished lenses") to a lenses manufacturer (a lens whose faces are able to correct the optical deficiencies of the wearer but which is not able to be mounted in the frame because of its generally circular outline).

The grinding machine is able to shape each lens 20 and the 3D printer is able to manufacture the joints 30.

The control unit is of the electronic and/or computer type and it serves in particular to control the grinding machine and the 3D printer, and to acquire the geometrical characteristic of the frame 10 and of each semi-finished lens.

The acquisition of at least one geometrical characteristic of the frame 10 may consist in acquiring only the diameter of the rims of the frame 10 when these rims have a circular shape.

More generally, this step consists in acquiring the shape of the outline of each rim of the frame, and/or the thickness of the rims, and/or the distance between the two rims of the frame.

Here, this step comprise the acquisition of the three-dimensional shape of a longitudinal profile extending along the internal face of one of the rims of the frame 10.

This longitudinal profile may for example be acquired in the form of a set of triplets, the triplets corresponding to the coordinates of a plurality of points characterizing the shape of the longitudinal profile.

Preferably, the longitudinal profile is acquired in a database registry made available to the optician. The database registry is regularly updated by the eyeglass frame manufacturer. It includes a plurality of records, each associated with a model of eyeglass frame. Each record then includes an identifier of the eyeglass frame model with which it is associated, and a set of 360 triplets that are characteristic of the shape of the longitudinal profile of each rim of that eyeglass frame model.

In a variant, the longitudinal profile may be acquired using an imaging device having image capture means and image processor means. By using the imaging device, the coordinates of points characterizing the longitudinal profile may be acquired by taking a photograph of a presentation lens delivered with the eyeglass frame, and then processing the photograph so as to identify on the photograph 360 points that are situated on the edge face of this presentation lens and that are characteristic of the shape of the longitudinal profile of the associated rim of the frame.

The three-dimensional shape of the longitudinal profile may equally well be acquired in some other way, for example by tracing, i.e. by making contact with the edge face of the presentation lens with a tracer.

The acquisition of at least one geometrical characteristic of each lens 20 may consist in acquiring the shape of the outline of the lens (for instance a diameter in the case where the lens has a circular shape), and/or the thickness of the edge of the lens and/or a mapping of each face of the lens.

Here, this step comprises the acquisition of the three-dimensional shape of the outlines of the front face and the rear face of each lens 20.

These outlines may for example be acquired in the form of a set of triplets, the triplets corresponding to the coordinates of a plurality of points characterizing the shape of each outline.

Preferably, the triplets are acquired in a database registry made available to the optician.

In a variant, the triplets may be acquired using an imaging device having image capture means and image processor means, by taking a photograph of each lens.

The three-dimensional shape of the outlines may equally well be acquired in some other way, for example by tracing, i.e. by making contact with the edge of each lens 20 with a tracer.

In the first embodiment shown in FIG. 1, the joints 30, the lenses 20 and the frame 10 are manufactured from separate pieces.

In this embodiment, this joint 30 is colored in a matt black, and it has a substantially rectangular section shape. Thus, its front face 33 and rear face 34 are parallel.

In this embodiment, the external face 32 of the joint 30 extends along a profile identical to the acquired longitudinal profile of the rim and the internal face 31 of the joint 30 extends along a profile identical to the acquired longitudinal profile of the lens.

In a variant, the joint 30 may be manufactured so that its internal face 31 presents a shape identical, in negative, to the shape of the edge of the lens 20, and so that its external face 32 presents a shape identical, in negative, to the shape of the rim of the frame 10.

In this variant, if the rim of the frame has a bezel, the external face of the joint is beveled in such a manner that its bevel can engage into the bezel of the rim. In the same way, if the lens is beveled, the internal face of the joint is grooved in such a manner that its groove can engage onto the bevel of the lens.

In a variant, the joint may have a different shape. For instance, it may be U-shaped, in order to sandwich the edge of the lens.

In this embodiment, the lenses may have a standard outline, and may be manufactured in mass production (together with other identical lenses, for a reduced cost), the joint 30 being able to make the interface between the standard lenses and the frame selected.

In the embodiment shown in FIG. 2, the joint 30 and at least a part of the frame 10 are manufactured so as to form a single piece (ie a piece than is not able to be disassembled without breaking it). The joint 30 has a color that is close to that of the frame 10 and that is more matt. In a variant, the joint 30 may have a gradient of color, with a color identical to that of the frame on its external face, and a color more matt on its internal edge.

In this embodiment, a first part of this assembly (the one corresponding to a part of the frame 10) is manufactured by using a traditional technology, for instance with molds, and the second part of the assembly (the one including the joints 30) is manufactured by additive technology.

In the embodiment shown in FIG. 2, the first part is only composed of two temples 11. The second part forms a bridge 13 and two rims 12 suitable for receiving the two lenses 20. Here, each joint 30 is formed by an internal part of the associated rim 12.

In a variant, only the joint may be manufactured by additive technology, into the rims, thanks to a method comparable with an overmolding technology.

Whatever the method used, at least a part of the frame 10 forms a skeleton manufactured in mass production (ie: together with other identical standardized frames). The personalization only affects the second part.

Thanks to this characteristic, the cost of the eyeglasses equipment 1 is reduced, and it is easier to modify a part of the eyeglasses equipment 1 in order to modify its whole appearance on-demand.

In this embodiment, at least a part of the joint 30 is formed from an elastic material or from an auxetic material.

Here, this elastic part of the joint 30 is a temporal part which has a function of hinge for a temple 11 of the frame. Indeed, the chosen material is able to authorize the wearer to fold the temples 11.

The manufacturing of this assembly may include the steps of:
  selecting the temples 11,
  acquiring the geometrical characteristics of these temples 11 (for instance thanks to a database),
  choosing the shape of the second part of the assembly,
  building a first skin of this assembly in a rigid material, thanks to an additive technology,
  building into this first skin an auxetic structure, layer by layer, such that this structure is able to surround the associated lens 20 and to form the hinge for the temple 11, and
  assembling the temples together with this second part.

An advantage of such an eyeglasses equipment is that it let the wearer the possibility to custom his frame by easily changing the temples 11.

In a variant of the embodiment shown in FIG. 2, the joint 30 and the frame 10 are manufactured by additive technology, preferably each element being made from a different material (with different Young's moduli to ensure maintenance of the shape of the frame and reduced mechanical stresses between the frame and the lens). In a variant, the joint may have an elasticity gradient between its inner face in contact with the lens and its outer face in contact with the frame.

In another case where the frame is a "Nylor" one, the joint may have different properties along its outline, depending on it will be in contact with a rigid part of the frame or with a wire of nylon of the frame.

In the embodiment shown in FIG. 3, the joint 30 and the lens 20 are manufactured so as to form a single piece. The joint 30 can have a color that is close to that of the lens 20 and that is more matt. In a variant, the joint 30 may have a gradient of color, with a color identical to that of the lens on its internal face, and a color more matt or darker on its external edge.

In this embodiment, a part corresponding to the lens 20 is manufactured by using a traditional technology (for instance, a molding technology) and another part corresponding to the joint 30 is manufactured by additive manufacturing technology. In a variant, the lens and the joint may be manufactured by an additive technology.

Figure 4:
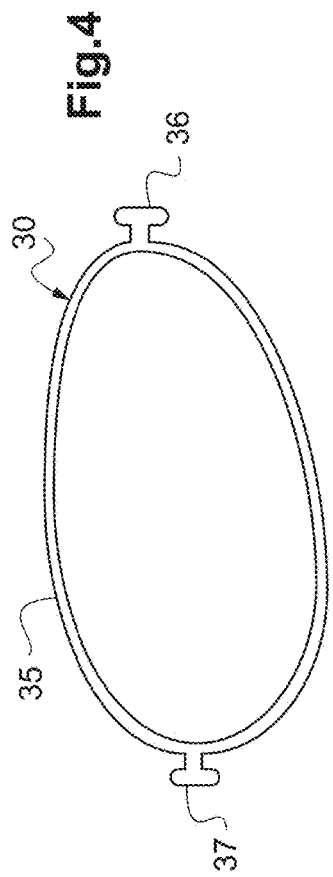
FIG. 4 is a schematic view of a lens of the eyeglasses equipment shown on FIG. 3.

In this embodiment, the joint 30 is made from a rigid material. As shown in FIG. 4, this joint 30 comprises a principal part 35 that is designed to surround the lens 20, and two parts 36, 37 that projects from the principal part 35 in two opposite directions. Each of these two parts has a T-shape. One of these two parts has a function of attachment for a temple 11 of said frame 10, and the other part has a function of attachment for the bridge 13 of the frame 10.

Here, the two parts 36, 37 of the joint 30 are rigid when the rest of the joint 30 is able to be made in a rigid and/or in an elastic material.

Because the joint is manufactured by additive technology, the shape of these two parts can easily be modified as a function of the shape of the temples and of the bridge chosen by the wearer. Moreover, in this embodiment, the bridge and the temples of the frame 10 may be easily interchanged for either fashion or utilitarian reasons.

To sum up, the preparation of the eyeglasses equipment 1 by an optician may include the following steps of:
  a) ordering a frame 10 (or a part of a frame) from a manufacturer of frame,
  b) ordering two lenses 20 from a manufacturer of lenses, and
  c) manufacturing the corresponding joints 30 in accordance with the frame and lenses designs.

The step a) is usually done in such a manner that the optician has several frames to propose to the wearer. Whatever, at step a), the optician knows the frame references so that he is able to find in a database the characteristics of the frame 10.

The step b) is operated by the optician when the wearer has chosen his frame and when he has given to the optician his prescriptions. The lenses ordered by the optician could be blanks (ie lenses whose edge and surfaces must be shaped by the optician), or semi-finished lenses (ie lenses whose edge must be shaped), or finished lenses (ie lenses that has not to be machined by the optician, thanks to the use of the joints 30).

The step c) is operated thanks to an additive manufacturing technology. It can be operated by the optician, or by the manufacturer of frame, or by the manufacturer of lenses.

Indeed, since the joint 30 can be manufactured with precision and since it can be elastic, it is able to prevent from any misfit between the lens 20 and the frame 10. That is why the lenses 20 and the joints 30 could be manufactured and edged by a manufacturer distinct from the optician (for lower costs).

In a variant, the frame 10, the joints 30 and the lenses 20 may be mailed to the wearer, the wearer or an optician chosen by the wearer being able to realize the final mounting step.

In a variant of the embodiment shown in FIG. 3, the joint 30 may have an elastic gradient, to be more resilient on its external face than on its internal face.

Others particular embodiments may be considered.

In a first embodiment, we can consider a wearer who wants to change his frame 10 while keeping his lenses 20.

In this embodiment, the wearer may go to the shop of the optician in order to select a new frame 10. After having chosen his new frame, the wearer gives the optician his eyeglasses equipment 1. Here, we can consider that this eyeglasses equipment 1 include a frame 10, two lenses 20 and two joints 30A that surround the two lenses 20 and that form a single piece with these lenses 20.

Figure 8:
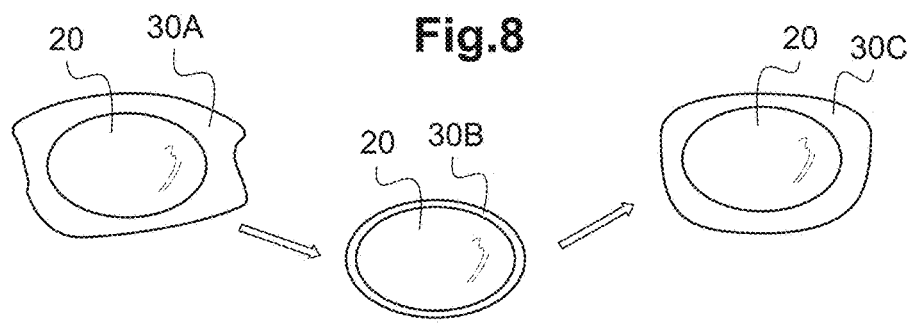
FIG. 8 shows steps of a method for remanufacturing a lens.

Here, as shown in FIG. 8, the optician job consists in extracting the two lenses 20 and their joints 30A from the frame 10 and in resizing the joints so that the lenses 20 can be fitted in the new selected frame 10.

To do that, the optician has to get the characteristics of the old frame and the characteristics of the new frame, and to determine the gap between the rims of these two frames.

Then, as shown in FIG. 8, if the gap is negative, the optician calculates blocking data, he blocks the lens in a grinding machine, and he cuts out the lens to minimize the joint 30B according to known methods. Then, he prints a new joint 30C on the edge of the joint 30B, thanks to the 3D printer, in such a manner that the shape of the edge of this new joint 30C correspond to the shape of the associated rim of the new frame.

Otherwise, if the gap is positive, the optician directly prints a new joint on the edge of the old joint in order to fill the space between the old lens and the rim of the new frame.

The list of information required for such an operation are the lens base (ie the radius of curvature of one of the faces of the lens), the pupillary distance (ie the distance between the pupils of the wearer), the original frame characteristics (for instance, its 3D shape or the 2D shape of its rims), and the new frame characteristics.

The original frame characteristics could be either measured with a tracer (such a tracer is for instance described in document U.S. Pat. No. 8,205,345) or collected in a database (thanks to the reference of the frame).

This method can be operated in a couple of minutes, so that the wearer can immediately go out from the shop with his new eyeglasses equipment 1.

In a variant, this method may be operated on an eyeglasses equipment that has initially no joint.

In a second embodiment, we can consider a wearer who wants to change his lenses 20 while keeping his frame 10.

Figure 6:
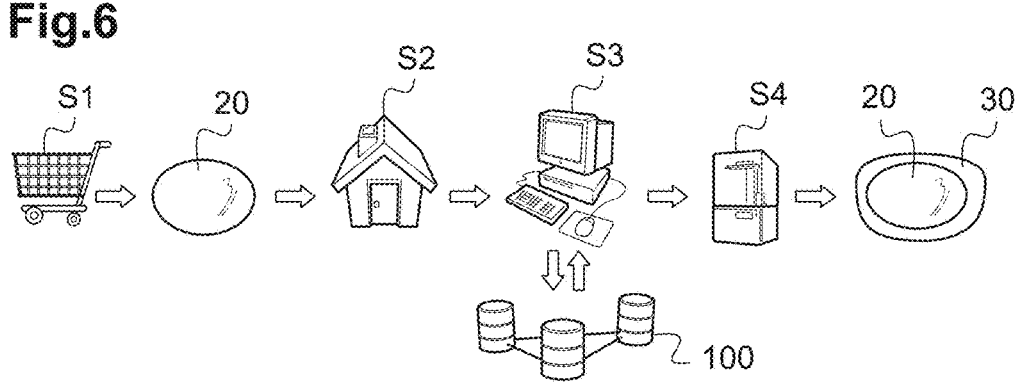
FIGS. 6 and 7 show steps of a method for preparing an eyeglasses equipment according to two various process.
Figure 7:
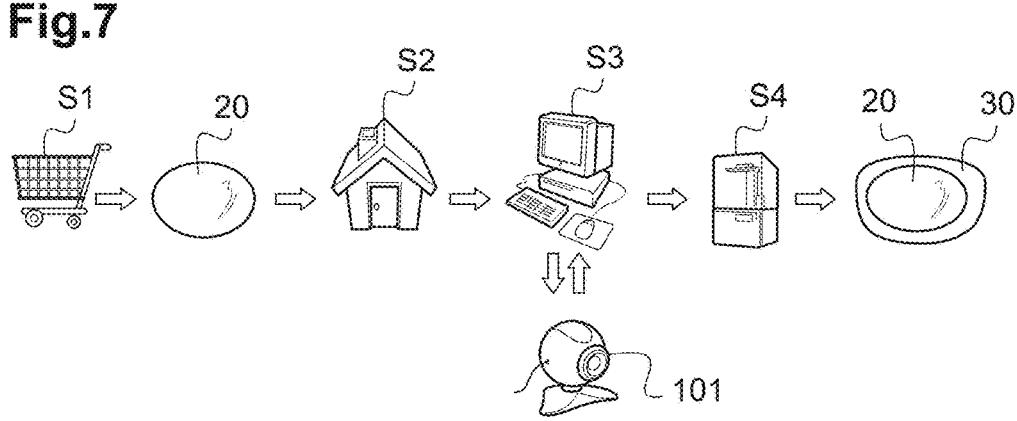

Here, as shown in FIGS. 6 and 7, the wearer has to order a pair of lenses 20. It may do this operation over the Internet, by visiting the lenses manufacturer website and by filling prescriptions fields (step S1).

Then, when he receives at home the lenses 20 corresponding to his prescriptions (step S2), he has to order joints that are able to help him to mount the lenses in his frame 10. Indeed, the lenses 20 have predefined shapes (for example elliptical) that do not correspond to the shape of the rims of his frame 10.

The wearer can visit a joint manufacturer website so as to order the joints 30 (step S3). To order these joints 30, he has to give information relative to his frame 10.

For instance, he can give the references of his frame 10, so that the joint manufacturer can retrieve in a database 100 the frame characteristics (FIG. 6).

Otherwise, these frame characteristics may be obtained thanks to a video acquisition, by using the webcam 101 of the computer of the wearer (FIG. 7).

Finally, the joints are manufactured (step S4) and are sent to the wearer so that he may assemble his equipment.

In a variant, the lenses and the joints may be ordered at the same time to a single manufacturer.

In a third embodiment, we can consider a wearer who wants to change his lenses while keeping his frame or to change his frame while keeping his lenses or to change his frame and his lenses, thanks to an equipment at its disposal, for instance in a supermarket. Such an equipment is described in document WO 2013132165 and WO 2013132049.

This equipment may carry several frames that the wearer may choose. Hence, the wearer can select the frame 10 and the lens 20 which correspond to its eye prescription and also the associated joint 30.

In a variant, the equipment may catch a photo of the wearer and display this photo on a screen superposed with an image of a frame. Thus, the wearer is able to see several photos of him with different frames so that he can virtually choose a frame.

Moreover, this equipment is able to acquire the prescriptions of the wearer and to detect characteristics relative to the wearer (for instance, his pupillary distance). To do that, the equipment may operate small tests described in document FR2987918.

Finally, the equipment is able to send a message to a lens manufacturer to order the lenses and the joints, so that the wearer can receive his new eyeglasses equipment 1 at home (in the form of a kit that he has to assembly).

In a variant, the equipment may include a 3D printer and store a variety of temples, bridges and lenses. In this variant, the equipment may automatically manufacture the joints and paint the frame and the joints. Then, the equipment is able to deliver a bridge, two temples, two lenses and two joints (of the type represented on FIG. 3) in such a way that the wearer only has to engage the temples and the bridge on the parts 36, 37 formed by the joints 30 to assemble his eyeglasses equipment 1.

In a variant, the equipment may have also several pair of lenses 20 of different power prescription which have predefined shapes (for example elliptical) that do not correspond to the shape of the rims of the frame 10. In addition the equipment may have a set of different joints to use for the specific frame selected. The wearer can select a joint (30) from a multiple selection of joints presenting a shape determined as a function of at least one geometrical characteristic of the frame and/or at least one geometrical characteristic of the lens. Here, he selects a joint whose geometry corresponds to the geometry of the lens.

In a fourth embodiment, the joint 30 houses at least one electric and/or electronic component.

In this embodiment, the joint can also house an additional element that is manufactured together with the joint by additive technology and that is linked to the electrical component.

For instance, this additional element may be a Faraday cage (realized around a communication circuit like a RFID chip), a thermal dissipating material . . . .

Indeed, the joint represents an opportunity to add to the eyeglasses equipment one or more functions.

For example, the chip may memorize the references of the lenses and/or the references of the selected frame and/or characteristics relative to the shape of the frame, the lenses and the joints. This memorized information may be used later, for instance if the wearer, after having broken one of his lenses, want to replace it.

In a variant of the invention that is not represented in the figures, we could consider that the eyeglasses equipment may comprise a single joint and a single lens mounted in the frame so that it is simultaneously placed behind the right and left eyes of the wearer: in this case, the lens would form a kind of mask.

The invention claimed is:

1. Eyeglasses equipment including:
   a frame, and
   at least one ophthalmic lens mounted into said frame,
   wherein said eyeglasses equipment includes an interface that is situated between said frame and said lens and that is colored, and
   wherein a face between said lens and said interface has a level of light absorption that is greater than the level of light absorption of a face between said lens and the internal face of said frame.

2. Eyeglasses equipment according to claim 1, wherein said interface extends at least along a temple part or a nasal part of the periphery of the ophthalmic lens.

3. Eyeglasses equipment according to claim 1, wherein said interface covers the entire width of the ophthalmic lens.

4. Eyeglasses equipment according to claim 1, wherein said interface is a thin layer of material distinct from the material of the ophthalmic lens and from the material of the frame.

5. Eyeglasses equipment according to claim 1, wherein said interface is a joint manufactured by an additive technology, that fastens said frame to said lens.

6. Eyeglasses equipment according to claim 5, wherein said joint is colored in the mass.

7. Eyeglasses equipment according to claim 5, wherein said joint is made from a material that is different from the material of the lens and that is also different from the material of the frame.

8. Eyeglasses equipment according to claim 5, wherein said joint, said frame and said lens form separate pieces.

9. Eyeglasses equipment according to claim 5, wherein said joint and at least a part of said frame form a single piece.

10. Eyeglasses equipment according to claim 5, wherein said joint and said lens form a single piece.

11. Eyeglasses equipment according to claim 5, wherein said joint is formed from an auxetic material.

12. Eyeglasses equipment according to claim 5, wherein said joint houses at least one electric or electronic component.

13. Eyeglasses equipment according to claim 5, wherein said joint is formed from an elastic material.

14. Eyeglasses equipment according to claim 13, wherein said joint comprises a temporal part that has a function of hinge for a temple of said frame.

15. Eyeglasses equipment according to claim 5, wherein said joint is formed from a rigid material.

16. Eyeglasses equipment according to claim 15, wherein said joint comprises a temporal part that has a function of attachment for a temple of said frame.

17. Method for providing an eyeglasses equipment including steps of:
    selecting a frame, and
    selecting at least one ophthalmic lens to be mounted into said frame,
    wherein said method includes steps of:
    determining a color for an interface, and
    assembling said lens and said frame so that said interface is situated between said frame and said lens and so that a face between said lens and said interface has a level of light absorption that is greater than the level of light absorption of a face between said lens and the internal face of said frame.

18. Method according to claim 17, wherein said interface and said lens are manufactured to form a single piece.

19. Method according to claim 17, wherein said interface is a joint, including steps of:
    acquiring at least one geometrical characteristic of the frame or at least one geometrical characteristic of the lens,
    manufacturing said joint by an additive technology, said joint presenting a shape determined as a function of said geometrical characteristics, and
    assembling said lens, said joint and said frame, by placing said joint between said frame and said lens.

20. Method according to claim 19, wherein said joint, said lens and said frame are manufactured from separate pieces.

21. Method according to claim 19, wherein at least one electrical component is manufactured by additive technology together with said joint, so that said electrical component is housed into said joint.

22. Method according to claim 17, wherein said interface and at least a part of said frame are manufactured to form a single piece.

23. Method according to claim 22, wherein said frame is manufactured together with other identical standardized frames.

* * * * *